United States Patent [19]

Richman

[11] 4,320,512

[45] Mar. 16, 1982

[54] MONITORED DIGITAL SYSTEM

[75] Inventor: Jay L. Richman, Montville, N.J.

[73] Assignee: The Bendix Corporation, Teterboro, N.J.

[21] Appl. No.: 162,274

[22] Filed: Jun. 23, 1980

[51] Int. Cl.³ .......................................... G06F 11/12
[52] U.S. Cl. ........................................ 371/52; 371/57
[58] Field of Search ...................... 371/52, 49, 15, 57

[56] References Cited

U.S. PATENT DOCUMENTS

| | | | |
|---|---|---|---|
| 2,958,072 | 10/1960 | Batley | 371/49 |
| 3,160,852 | 12/1964 | Simms, Jr. | 371/52 |
| 3,371,315 | 2/1968 | Huffman et al. | 371/52 |
| 3,693,152 | 9/1972 | Hong | 371/49 |
| 4,087,786 | 5/1978 | Lescinsky et al. | 371/52 |

OTHER PUBLICATIONS

Sellers et al., Error Detecting Logic for Digital Computers, McGraw-Hill, 1968, pp. 59-63 and 212-219.

Primary Examiner—Charles E. Atkinson
Attorney, Agent, or Firm—Anthony F. Cuoco; Thomas L. Adams

[57] ABSTRACT

A tester determines a system failure by employing an error detector (28, 30, 32; 40, 42, 44, 46) coupled to the plurality of output lines from a strobing circuit (10, 12, 14, 16, 18). This strobing circuit normally generates a singular signal on one of these plurality of lines. The error detector (28, 30, 32; 40, 42, 44, 46) responds to a singular signal being produced on two of the plurality of lines by producing an error signal. Thus, in the preferred embodiment a performance check can be performed on a significant number of internal digital lines by monitoring a single line which may be routed to an external connector.

12 Claims, 2 Drawing Figures

MONITORED DIGITAL SYSTEM

BACKGROUND OF THE INVENTION

The present invention relates to digital tests and, in particular, to apparatus that monitors a plurality of lines to provide therefrom a single error signal.

It is known to employ a parity generator to supplement a transmitted or stored digital signal. This parity generator produces an addition data bit which renders the number of high signals (digital ones) in the group either even or, for some embodiments, odd. Thus, when transmitted data is received or removed from memory its validity can be ascertained by determining that the parity of the signal is correct. This technique is particularly effective where one of the data lines has failed and is producing a constant erroneous signal.

It is important during manufacture, in the field and at other times to test digital equipment for faults. Complete testing of digital systems is difficult because of the extremely large number of valid states which the system can assume and the great number of signal lines which may be monitored. Often, it is not practical to sequence a piece of digital equipment through all of its possible states and monitor each data line during each state because of the vast number involved and because of time limitations.

A conventional technique for testing digital equipment is routing a limited number of test points from the circuit to a connector, such as an edge connector for a printed circuit board. Of course, the number of test points must be limited since a printed circuit board can accommodate only a limited number of interconnecting runs and contact pads for edge connectors.

For this reason, known error checking circuits employ AND or OR gates for monitoring the validity of the outputs from a one out of N decoder. A one out of N decoder typically responds to binary coded data by producing a singular or strobed signal on one of N lines. The inputs of such an AND or OR gate are connected to these N lines to produce an error signal if all of the monitored lines are improperly, in the same state. This latter technique however, fails to detect a common failure mode wherein the strobing of one particular line erroneously causes simultaneous strobing of another line.

Parity checkers have been proposed in the literature for monitoring a plurality of internal points on a printed circuit board and transmitting a single error signal. This approach has been proposed for monitoring the flip flops, the carry outputs of counters and the final outputs of shift registers.

None of the above approaches have considered the significant testing problems inherent in monitoring the strobed output lines from a one out of N decoder. Therefore, there is a need for circuitry and a method for testing strobed lines to detect a failure such as strobing on two lines. The approach ought not to require excessive wiring or an excessively large connector.

SUMMARY OF THE INVENTION

In accordance with the illustrative embodiments demonstrating features and advantages of the present invention, there is provided a monitored digital system operable to determine a system failure. The system includes a strobing means and an error detection means. The strobing means has a plurality of output lines for generating a singular signal on one of the plurality of lines. The error detection means is coupled to the plurality of lines for producing an error signal in response to the singular signal being produced on two of the plurality of lines.

According to a related aspect of the present invention there is provided a method for determining an erroneous signal from a strobing means. The strobing means normally produces a singular signal on one of a plurality of lines. The method comprises the steps of sensing whether the number of lines carrying the singular signal is even and producing an error signal if the number is even.

By employing the apparatus or method of the present invention a relatively complicated digital system can be simply monitored for erroneous signals. This monitoring is performed without the need for routing a large number of discrete digital signals a great distance. Thus the monitored system can conveniently include built in test equipment which facilitates manufacturing or pre-operational performance checks. Accordingly, the present invention avoids the expense, complication, and wiring density which would be required to route a large number of test points to an externally accessible connector.

In the preferred embodiment of the present invention, the monitoring circuitry determines whether the number of lines being strobed is odd or even. The strobbing of an even number of lines indicates that, improperly, none or two of the lines are being strobed. Such invalid strobing causes the production of an error signal. Preferably, commercially available parity checking circuits are used to determine whether the number of lines being strobed is odd or even. The parity checkers are preferably connected together so that they, as a group, monitor a large number of strobed lines. The single output of the parity checkers can be transmitted on a single line to an externally accessible terminal for verifying the validity of the internally produced signals.

BRIEF DESCRIPTION OF THE DRAWINGS

The above brief description, as well as other objects, features and advantages of the present invention will be more fully appreciated by reference to the following detailed description of presently preferred but nonetheless illustrative embodiments, when taken in conjunction with the accompanying drawings, wherein.

DETAILED DESCRIPTION OF THE PREFERRED EMBODIMENT

Figure 1:
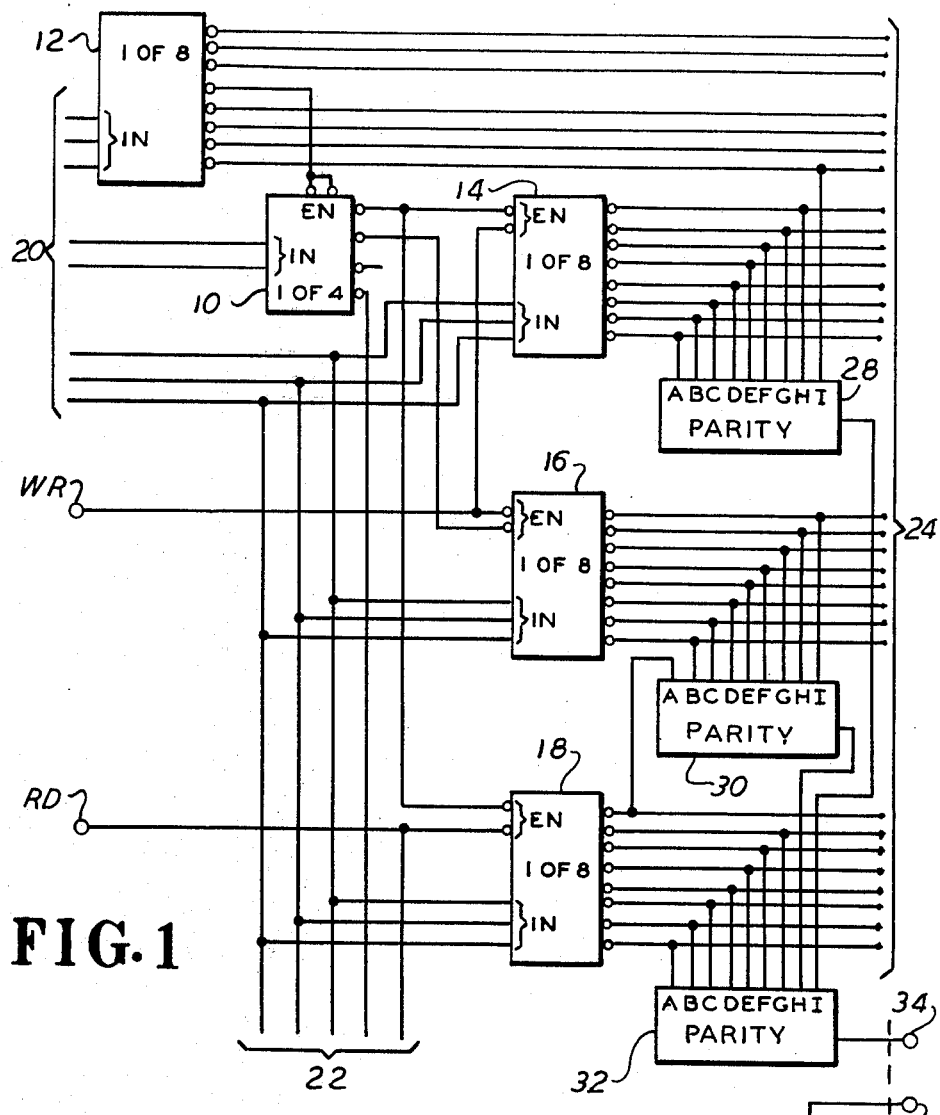
FIG. 1 is a schematic illustration of a monitored digital system according to the present invention.

Referring to FIG. 1, an illustrated strobing means is shown as five decoder means: 1 of 4 decoder 10 and 1 of 8 decoders 12, 14, 16, 18. Decoders 10–18 are commercially available integrated circuits such as SN54LS138 and SN54LS139 (Texas Instruments, Inc. or equivalent). Each of decoders 10–18 responds to binary coded data applied to their respective inputs IN. For this reason they are connected to a means for transmitting a digital address shown herein as address lines 20. The three uppermost of address lines 20 are connected to input IN of decoder 12. The two next lower lines are connected to input pair IN of decoder 10. The remaining three lines of lines 20 are each separately connected to different common terminals, each comprising one terminal from each of the input trios IN of decoders 14, 16 and 18.

Each of decoders 10–19 produces a high output on all but one of its inverted outputs, that one being the one which corresponds to the digital code applied at its input IN. Additionally, decoders 10, 14, 16 and 18 have pairs of enable inputs EN which, unless both are low, render all of the outputs of their respective decoders high. One of the outputs of decoder 12 is connected only to the enable inputs EN of decoder 10. One output of decoder 10 is commonly connected to one enable line EN from each of the decoders 14 and 18. The other enable lines EN of decoders 14 and 18 are connected to terminals WR and RD, respectively. Another output of decoder 10 is connected to one line of enable input EN of decoder 16 whose other line is connected to terminal WR. Another output of decoder 10 is unconnected and the remaining output is routed to bus group 22 which connects to other similar devices in a well known manner. Also included in bus group 22 is a line running to terminal RD and three lines, each connected to a different input of input trio IN of decoder 18.

As will be apparent to persons skilled in the art, the outputs of decoders 12, 14, 16 and 18 comprise 31 parallel strobe lines 24. Depending upon the binary code supplied to address line 20 and the write and read commands supplied to terminals WR and RD, respectively, one out of the 31 strobe lines will be in a singular state that differs from the others. In this embodiment one of the strobe lines 24 will be in a low state, although in other embodiments the singular state may be a high state.

A typical application of the foregoing equipment is selectively commanding various memory devices to read or write data. In addition, various input or output devices may be selected such as: digital to analog converters, analog to digital converters, state sensors, electromechanical actuators, switches, etc. Of course, various other applications are known in the art for strobing circuits.

Lines 24, referred to herein as a plurality of lines, interconnect to other internal devices that are part of a larger subsystem. In this embodiment lines 24 interconnect to devices mounted on a printed circuit board, illustrated herein by dashed line 26. Printed circuit board 26 is an example as what is referred to herein as a system frame.

An error detection means is illustrated in this Figure as a parity checking means comprising first parity circuit 28, second parity circuit 30 and third parity circuit 32. Parity circuits 28, 30 and 32 may be commercially available integrated circuits such as: SN54LS280 or SN54S280 (available from National Semiconductor, Texas Instruments, etc.). Parity circuits 28, 30 and 32 each have nine inputs A–I, the remaining terminal illustrated being a parity output line. This parity output line produces a high signal when the parity of inputs A–I is odd. Odd parity exists when the number of high signals applied to inputs A–I is odd. For example, odd parity exists when all of the nine inputs A–I are high and even parity exists when only one of the inputs A–I is low. Therefore, odd parity would also exist when two of the nine inputs A–I are low. As explained hereinafter, odd parity corresponds to the improper condition of two or none of the lines being strobed.

Each of the nine inputs A–I of parity circuit 28 are separately connected to the eight outputs of decoder 14 and one output of decoder 12. Each of the inputs A–I of parity circuit 30 are separately connected to the eight outputs of decoder 16 and one output of decoder 18. Each of the other outputs of decoder 18 are separately connected to a different respective input A–G of parity generator 32. Input H and I of parity generator 32 are connected to the outputs of parity circuits 30 and 28, respectively.

The output of parity circuitry 32 applies an error signal to terminal 34 which is one of a plurality of externally accessible terminals in a connector assembly. Other associated terminals from printed circuit board 26 are illustrated herein as terminals 36 and 38.

It is also to be appreciated that while parity generator/checkers are employed herein other circuits which perform the same essential function of distinguishing between one strobe and two or zero strobes may be employed instead. The specific circuitry chosen will depend upon availability, economics, speed, capacity, power, etc.

It will be observed that not all of the strobe lines 24 are coupled into parity circuits 28, 30, and 32, although they could be readily supplemented to monitor all of these lines. This expansion could be effected by adding another parity circuit and connecting its inputs to the unmonitored lines. The output of the added circuit could be connected to input G of parity circuit 32, the line formerly monitored thereby then being monitored by one of the inputs of the added parity circuit.

Instead of funneling the parity circuits to one of them as in FIG. 1, other arrangements are contemplated. For example, each parity circuit can be sequentially cascaded so that each applies its output to an input of the next one of the sequence.

Figure 2:
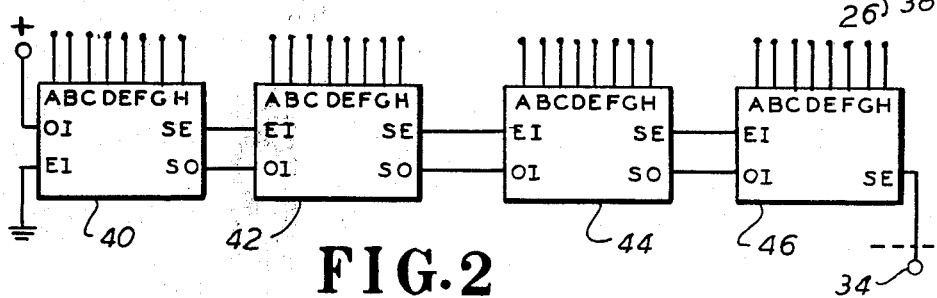
FIG. 2 is a schematic illustration of an error detection means which is an alternate to that employed in the system of FIG. 1.

Referring to FIG. 2, an alternate error detection means is illustrated which employs parity circuits 40, 42, 44 and 46. Each of them may be either the integrated circuits previously described in connection with FIG. 1 or part No. SN54180 (commercially available from National Semiconductor, Texas Instruments, etc.). Thus, an advantage of the arrangement of FIG. 2 is the interchangeability of integrated circuit types.

Each of the parity circuits 40–46 has eight inputs A–H. Each also has an output SE and SO which is high when the parity is even and odd, respectively. Each also has an input EI and OI which can be connected to the outputs SE and SO of another similar device for cascading a number of parity circuits. As shown herein inputs EI and OI of parity circuit 40 are grounded and high, respectively, while its outputs SE and SO are separately connected to inputs EI and OI, respectively, of parity circuit 42. Parity circuit 42 has its outputs SE and SO separately connected to inputs EI and OI, respectively, of parity circuits 44, whose outputs SE and SO are connected to inputs EI and OI, respectively, of parity circuit 46. Output SE of parity circuit 46 is connected to terminal 34 which is the output terminal for an error signal.

Thus connected, the apparatus of FIG. 2 provides a low output when the overall parity of the signals applied to inputs A–H of circuits 40–46 is even. Since there are thirty two such inputs the output on terminal 34 is low when none or only two of the inputs A–H of the parity generators are low. This error signal is therefore similar to that of FIG. 1, except for an inversion in state significance.

To facilitate an understanding of the principles associated with the foregoing apparatus, the operation of the equipment of FIG. 1 will be briefly described. It will be appreciated that the alternate apparatus of FIG. 2 will operate similarly, except as noted. The strobing circuit comprising decoders 10-18 of FIG. 1 are operated by applying digital signals to address lines 20 and write or read terminals WR and RD. In a manner well understood in the art, one out of the 31 lines of strobe lines 24 will be low, the other lines assuming a high state.

It is to be understood that the six upper lines of strobe lines 24 are not connected to a parity circuit and therefore not monitored. But if a strobing signal is produced on one of these six lines the system is operating such that any error signal which may be produced on terminal 34 is either ignored, blocked by other gating equipment or is otherwise inconsequential. Therefore the following description will assume that one out of the twenty five monitored lines of strobing lines 24 ought to be in a low state while the others are high.

Assume now that one input, namely input E of parity circuit 28 is in the low state and that all other inputs to parity circuits 28, 30 and 32 are high. Accordingly, the output of parity circuit 28 is low since the parity to that unit is even (eight high inputs). Also, since all of the nine inputs of parity circuit 30 are high, it produces a high signal signifying its odd parity input. Consequently, the eight inputs A-H of parity circuit 32 are high while its input I is low. This situation, corresponding to even parity, causes parity circuit 32 to produce a low signal on terminal 34. This low signal signifies normal operation or the absence of an error signal.

Assume now that two low strobing inputs are being improperly applied to parity circuit 28, namely its inputs H and I. Accordingly, parity circuit 28 receives odd parity and applies a high output to input I of parity circuit 32. Since the other inputs of the parity circuits 30 and 32 are high, (circuit 30 applying a high signal to input H of circuit 32) the outputs of parity circuits 30 and 32 are also high. Consequently, a high output is applied by circuit 32 to terminal 34, indicating an invalid state for the strobe lines 24, namely double strobing.

It will be appreciated that if instead of two strobes being applied to one parity circuit, two strobes were separately provided to two different parity circuits, each of them would apply a low signal to circuit 32 which consequently would then produce a high signal on terminal 34, again indicating a fault. Similarly, if all of the strobe inputs to parity circuits 28, 30 and 32 were high, the output to terminal 34 would again be high, indicating a fault, namely the absence of a strobe.

It will be further appreciated that the application of any even number of strobes to circuits 28, 30 and 32 will also produce an error signal on terminal 34. In this (but not necessarily other) embodiments, the simultaneous application of three strobes does not produce an error signal. However, the production of three strobes requires double simultaneous failures, an event statistically so unlikely that it may be ignored.

It is to be appreciated that the apparatus of FIG. 2 operates similarly. However, in this latter embodiment, even parity, which corresponds to zero or an even number of strobes, produces a low error signal as opposed to a high error signal, but the output at terminal 34 is still a high as heretofore discussed with reference to FIG. 1.

It will be apparent that testing of the foregoing apparatus is relatively simple since the error checking is done locally, typically on the printed circuit board housing the associated subsystem. Thus, there is no need to route an excessive number of test points to an externally accessible test connector. In the foregoing embodiments only one test point, terminal 34, need be brought out to an external, accessible point even though 32 lines (FIG. 2) are being monitored.

It is to be appreciated that modifications and alterations may be implemented with respect to the apparatus just desribed. For example, the cascading of parity circuits may be accomplished in various fashions, with various numbers of parity circuits. Moreover, other integrated circuits having different levels of integration may be substituted for those described, depending upon the number of data lines being monitored. Furthermore, instead of parity circuits some embodiments may employ alternate circuits performing the same essential functions with, for example, discrete logic. In addition, all or fewer than all of the strobe lines can be monitored depending upon the operational requirements of the system. Also, it is expected that for systems where fewer than all of the lines are being monitored, additional gates will be used to block out an error signal when all strobes are properly in the same state. Also, other components may be substituted for those previously described depending upon the desired power, capacity, speed, size, etc.

Obviously, many other modifications and variations of the present invention are possible in light of the above teachings. It is therefore to be understood that within the scope of the appended claims the invention may be practiced otherwise than as specifically described.

What is claimed is:

1. A monitored digital system operable to determine a system failure, comprising:
    strobing means having a plurality of output lines for generating a singular signal on one of said plurality of lines; and
    error detection means coupled to said plurality of lines for producing an error signal in response to said singular signal being produced on two of said plurality of lines, said error detection means including:
    first and second matching circuits each having a plurality of data inputs and a check output, said data inputs of said first circuit being separately connected to at least one of said output lines and to said check output of said second matching circuit, a signal being provided on said check output of said second matching circuit in dependence on those of said output lines connected thereto and bearing said singular signal, but not in dependence on the other ones of said output lines.

2. A monitored digital system according to claim 1 wherein said first circuit is operable to produce on its check output said error signal in response to said singular signal being produced on none of said plurality of lines.

3. A monitored digital system according to claim 2 wherein each of said matching circuits comprises:
    identical parity checking means connected to respective ones of said plurality of lines and responsive to an even number thereof carrying said singular signal.

4. A monitored digital system according to claim 3 wherein an identical signal is provided on each check output of said second and first circuit if the data inputs of the latter are receiving said singular signal from an even number of said plurality of lines.

5. A monitored digital system according to claim 1 further comprising:

a system frame having a plurality of externally accessible terminals, said frame containing said strobing means and said error detection means, said plurality of lines providing internal electrical interconnections, none being connected to said externally accessible terminals.

6. A monitored digital system according to claim 5 wherein said error signal is coupled to one of said plurality of terminals.

7. A monitored digital system according to claim 6 wherein said plurality of terminals includes a connector assembly comprising all connectors mounted on said frame.

8. A monitored digital system according to claim 1 wherein said error detection means further comprises:

a third matching circuit having a plurality of data inputs and a check output which is coupled to a predetermined one of the plurality of data inputs of said first matching circuit.

9. A monitored digital system according to claim 1, wherein said error detection means further comprises:

a third matching circuit having a plurality of data inputs separately connected to at least one of said output lines and to the check output of said first matching circuit, said data inputs of said second matching circuit being connected to at least one of said output lines.

10. A monitored digital system according to claim 1 wherein said strobing means comprises:

means for transmitting a digital address signal; and decoder means responsive to said digital address signal for producing said singular signal.

11. A method for determining an erroneous signal from a strobing means normally producing a singular signal on one of a plurality of lines with an error signal generator having at least two matching circuits, said strobing means being mounted on a frame having a plurality of externally accessible terminals, said plurality of lines comprising at least two groups, comprising the steps of:

mounting said error signal generator on said frame connected to said lines and to a predetermined one of said externally accessible terminals;

providing an even signal from a given one of said matching circuits when said singular signal is carried on an even number of the lines from a predetermined one of the groups; and sensing if the other one of the groups is carrying on an even number of its lines said singular signal when said even signal is being produced by said given one of said matching circuits before applying from the other one of said matching circuits to said predetermined one of said externally accessible terminals an error signal.

12. A monitored digital system operable to determine system failure comprising:

a plurality of strobing decoders each having a plurality of output lines and a plurality of common input address lines, each plurality of output lines being operable to respond to its address lines to produce a singular signal;

a selecting decoder having a plurality of selecting address lines for rendering selective ones of said plurality of strobing decoders operative;

a plurality of parity circuits connected as a group and having a plurality of parity inputs each being connected to a different corresponding one of said output lines of said plurality of strobing decoders, said plurality of parity circuits producing an error signal in response to none and to an even number of singular signals being applied to their parity inputs; and a system frame containing said parity circuits, said selecting decoder and said strobing decoders, said frame having a connector assembly comprising a plurality of externally accessible terminals, one of them being coupled to said parity circuits to receive its error signal.

* * * * *